United States Patent [19]

Fisher

[11] 3,959,855
[45] June 1, 1976

[54] SHOULDER STRAP BRACKET

[76] Inventor: Robert C. Fisher, 4210 N. Dixie, West Palm Beach, Fla. 33407

[22] Filed: Oct. 29, 1975

[21] Appl. No.: 626,656

[52] U.S. Cl.............................. 24/163 FC; 280/747; 297/389
[51] Int. Cl.²................... B60R 21/10; A62B 35/02
[58] Field of Search............ 24/163 FC, 163 R, 196, 24/197, 198, 200, 265 R, 265 AL; 16/126, 127; 280/150 SB; 297/389; 190/57, 58 R

[56] References Cited
UNITED STATES PATENTS

| | | | |
|---|---|---|---|
| 2,483,307 | 9/1949 | Wheary | 190/58 R |
| 3,279,019 | 10/1966 | Eubank et al. | 24/200 X |
| 3,500,973 | 3/1970 | Bush | 190/57 |
| 3,692,155 | 9/1972 | Laurita | 190/57 |
| 3,834,730 | 9/1974 | Kansier | 280/150 SB |
| 3,876,249 | 4/1975 | Nilsson | 297/389 |

FOREIGN PATENTS OR APPLICATIONS

| | | | |
|---|---|---|---|
| 1,280,153 | 7/1972 | United Kingdom | 24/265 AL |

*Primary Examiner*—Donald A. Griffin
*Attorney, Agent, or Firm*—Harness, Dickey & Pierce

[57] ABSTRACT

A restraint system for an automotive vehicle or the like includes a seat belt and a shoulder strap. The shoulder strap has one end anchored to a retractor mounted on the vehicle body and the other end to a buckle. An intermediate portion of the shoulder strap extends through a slot in a bracket which is secured to the vehicle body. A liner of smooth plastic material is provided about the slot in the bracket to cover the raw metal edges and thereby prevent cutting of belt fibers, folding over, bunching, or otherwise overstressing the belt.

9 Claims, 5 Drawing Figures

U.S. Patent June 1, 1976 3,959,855
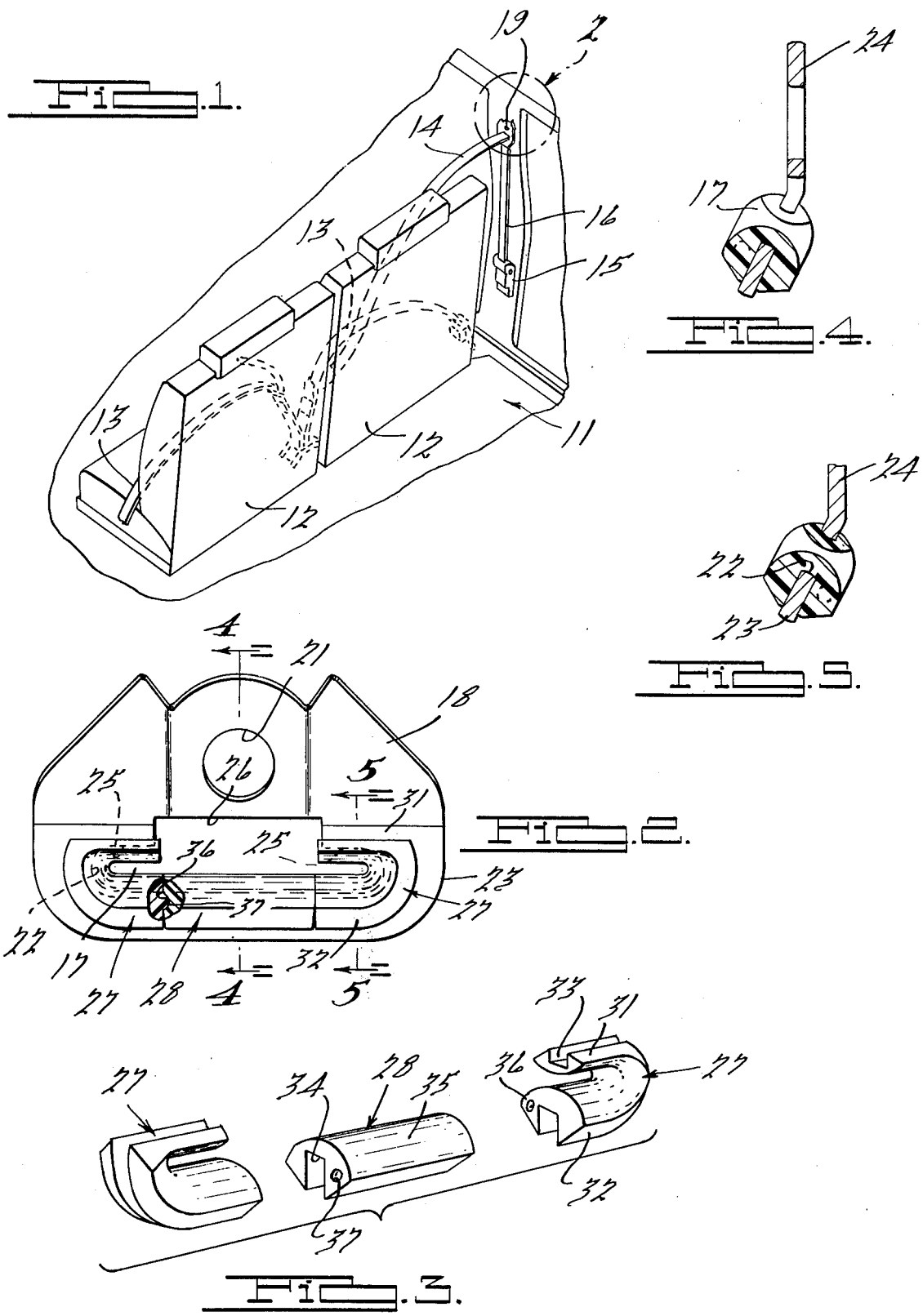

SHOULDER STRAP BRACKET

BACKGROUND OF THE INVENTION

Heretofore, a slotted bracket in the nature of a metal stamping has been provided to guide shoulder strap while being protracted along with a seat belt. Often the metal about the slot in the bracket damaged the material of the belt either by cutting the threads thereof or causing it to fold and bunch at the corners of the slot which resulted in the weakening of the strap at the point where it was supported in the bracket.

SUMMARY OF THE INVENTION

The invention pertains to the addition of plastic material about the aperture in a bracket through which the shoulder strap of a restraining device extends. The central portion of the slot is widened to receive molded plastic end elements which are guided into the ends of the slot and are retained therein by a central molded element which is disposed therebetween. The end elements are of U-shape and are provided with an outer slot which receives the metal defining the periphery of the bracket slot. The end elements are retained in the ends by a straight central element which contains a slot to receive a central portion of the edge of the bracket slot between the end elements thereby to provide a continuous plastic covered edge upon which the shoulder strap freely slides under pressure. The two molded end elements are alike and are formed in the same mold. Detent means is provided on the end elements and on the ends of the central molded element so that the elements will be locked in position when installed within the slot. The plastic material is preferably nylon, although other well-known plastic materials may be substituted therefor. The plastic elements are of arcuate shape and extend a substantial distance each side of the bracket slot to provide an arcuate surface of relatively large diameter. An upper arm of the U-shaped end elements covers the metal edges on each side of the slot so as to retain the belt against the lower portion of the end elements and central element. The belt can extend through the slot defined by the plastic elements at an angle and still operate under pressure and readily slide on the smooth surface of the nylon material. The arcuate end surfaces prevent the belt from reversing and folding upon itself or being caught and bunched up at the ends of the slot which substantially weakened the stressed portion of the belt.

BRIEF DESCRIPTION OF THE DRAWING

FIG. 1 is a perspective view of a vehicle front seat with the seat belts and shoulder straps provided thereon;

FIG. 2 is an enlarged view of the supporting bracket for the shoulder strap as viewed within the circle 2 of FIG. 1; FIG. 3 is an exploded perspective view of molded plastic elements illustrated in assembled position in FIG. 2;

FIG. 4 is a sectional view of the structure illustrated in FIG. 2, taken on the line 4—4 thereof, and FIG. 5 is a sectional view of the structure illustrated in FIG. 2, taken on the line 5—5 thereof.

DESCRIPTION OF THE PREFERRED EMBODIMENT

Referring to FIGS. 1 to 5 of the drawing, a vehicle body 11 is illustrated having a pair of front seats 12 with seat belts 13 disposed thereacross and with a shoulder strap 14 applied to the righthand seat. The strap 14 is secured at one end to a retractor 15 secured to the door pillar or to the floor. A portion 16 of the strap 14 extends upwardly along the pillar and passes through a slot 17 in a bracket 18 which swings on a pivot pin 19. The pin 19 extends through an aperture 21 in the bracket 18.

A slot 22 is provided in the lower portion 23 of the bracket 18, the lower portion 23 being bent outwardly from a supported top portion 24 at an angle of approximately 30°. The inner edge 25 of the slot 22 is cut away or notched at 26 to provide substantial width to the slot 22 in the inner central portion thereof. This widened area 26 permits plastic corner or end elements 27 to be accepted within the notch 26 and slid to the left and right thereby to cover the corner or end portion of the slot 22 with the plastic elements 27. The cutaway area 26 is also useful in permitting a central locking element 28 to be inserted between the two end elements 27 to secure them in position.

The elements 27 are of U-shaped cross section having an upper arm 31 and a lower arm 32 with a U-shaped slot or groove 33 extending inwardly along the outer periphery thereof for receiving the edge of the slot 22 when moved into the end positions. The central element 28 is likewise provided with a slot or groove 34 which mates with the slot 33 when the element 28 is inserted between the two end elements 27. The lower arms 32 and the central element 28 have a top surface 35 which is of broad arcuate cross section, for example, five times the thickness of the bracket 18, so as to slidably guide the seat belt 14. One side of the arm 32 on the elements 27 is provided with a dimple 36 while the mating side of the central element 28 has a dimple-receiving recess 37, the dimple and recess interlocking when the central element 28 is forced downwardly between the two end elements 27.

The arms 31 of the elements 27 cover the metal on the inner edge of the slot 22 which extends outwardly from the enlarged central area 26. Thus, the belt 14 is retained within the slot 17 and is freely movable therein without the possibility of damage occurring thereto due to cutting of the threads or folding over or bunching of the belt material. Friction is minimized by the large arcuate surface of the sections 27 and 28 across the bottom edge of the slot 17 and at the end portions thereof.

What is claimed is:

1. In a bracket for supporting a shoulder strap which extends through a slot therein, first and second plastic end elements in said slot, said elements being of U-shape and having a groove in the outer edge thereof for receiving the edge of the bracket slot, and a third plastic element having a grove along one edge insertable between said end elements to form a continuous plastic wall covering the outermost edge and ends of the slot.

2. In a bracket as recited in claim 1, wherein an inner wall of the bracket slot is widened to receive the first and second plastic elements before said elements are slid into the ends of the slot.

3. In a bracket as recited in claim 2, wherein the plastic elements are made of nylon.

4. In a bracket as recited in claim 3, wherein locking means between the engaged faces of the three elements retain the elements in fixed position within the bracket slot.

5. In a bracket as recited in claim 4, wherein the locking means embodies dimples and complimentary recesses on the ends of the elements.

6. In a bracket as recited in claim 5, wherein a dimple and recess interlock on opposite faces when the elements are moved into engaged relation to retain the elements in fixed relation over the edges of the slot.

7. In a bracket as recited in claim 1, wherein the plastic material provides a continuous surface along the outer edge of the bracket slot and over the end walls thereof and the portions of the inner wall at the outer edges of the widened portion covering the edge of the bracket slot except at the widened portion.

8. In a bracket as recited in claim 1, wherein the metal about the slots in the bracket is covered by a plastic material having an arcuate surface of a diameter approximately five times the thickness of said bracket at the outer edge and at the ends of the bracket slot to permit the movement of the belt under pressure therein without damage thereto.

9. In a bracket as recited in claim 1, wherein the upper portion of the bracket has an aperture by which it is pivotally supported with the bottom portion containing the slot bent outwardly at an angle relative to the upper portion with the widened portion of the bracket slot disposed beneath said aperture.

\* \* \* \* \*